July 31, 1923.

H. J. HANSON

WIRE REEL

Filed Sept. 23, 1922

H. J. Hanson
INVENTOR

BY Victor J. Evans
ATTORNEY

July 31, 1923. 1,463,696
H. J. HANSON
WIRE REEL
Filed Sept. 23, 1922  2 Sheets-Sheet 2
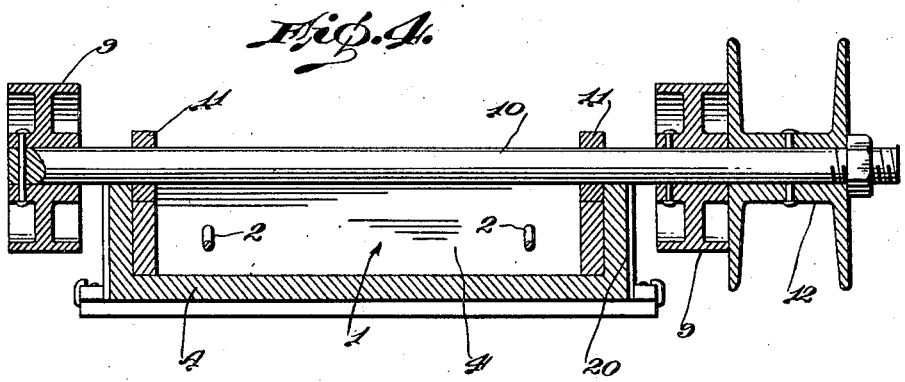
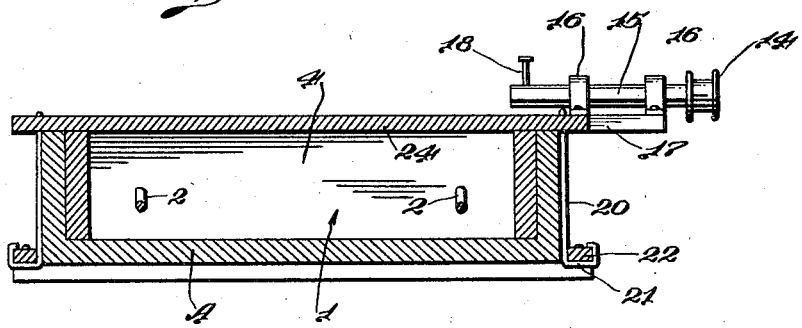
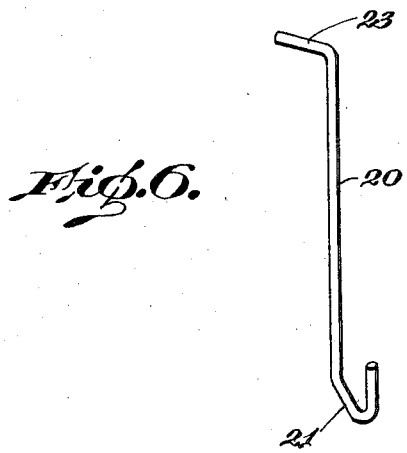

Patented July 31, 1923.

1,463,696

UNITED STATES PATENT OFFICE.

HENRY J. HANSON, OF THOR, IOWA.

WIRE REEL.

Application filed September 23, 1922. Serial No. 590,149.

*To all whom it may concern:*

Be it known that I, HENRY J. HANSON, a citizen of the United States, residing at Thor, in the county of Humboldt and State of Iowa, have invented new and useful Improvements in Wire Reels, of which the following is a specification.

This invention relates to devices for winding wire on reels, and an object of the invention is to provide a wire reel which may be used in connection with an ordinary farm wagon, for winding barbed wire, telephone wire, corn planter wire or the like upon a reel.

Another object of this invention is to provide a wire reel as specified which may be attached to an ordinary farm wagon, without requiring alterations to the wagon, and also to provide a wire reel which is comparatively simple in construction and embodies means for yieldably maintaining the friction wheels in engagement with the perimeters of the tires of the wagon wheels for rotating the wire reel to wind the wire thereon.

Other objects of the invention will appear in the following detailed description taken in connection with the accompanying drawings wherein:

Fig. 4 is a cross section through the wire reel taken on the line 4—4 of Fig. 1.

Fig. 5 is cross section on the line 5—5 of Fig. 1.

Fig. 6 is a detail perspective view of a part of the attaching structure.

Figure 1:
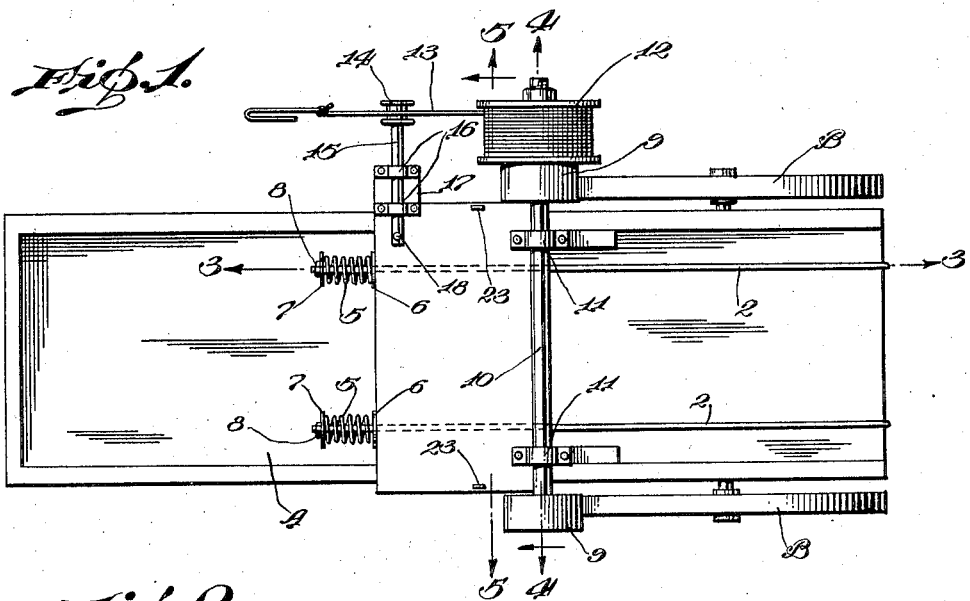
Fig. 1 is a top plan of the improved wire reel showing it applied.
Figure 2:
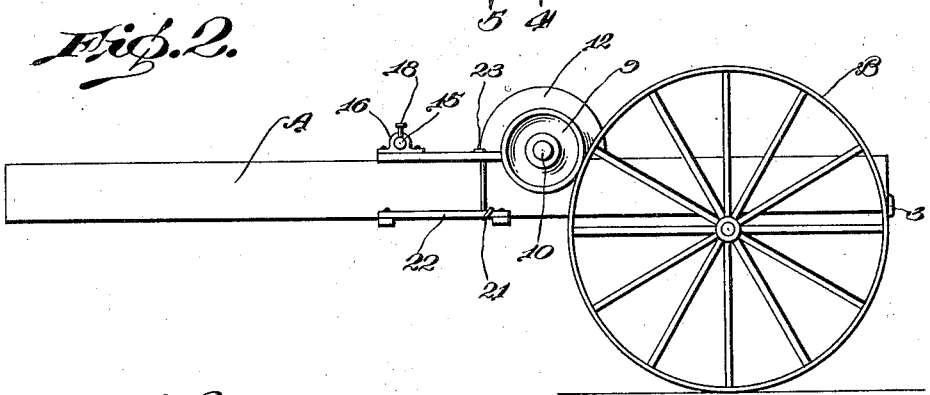
Fig. 2 is a side elevation of the wire reel applied.
Figure 3:
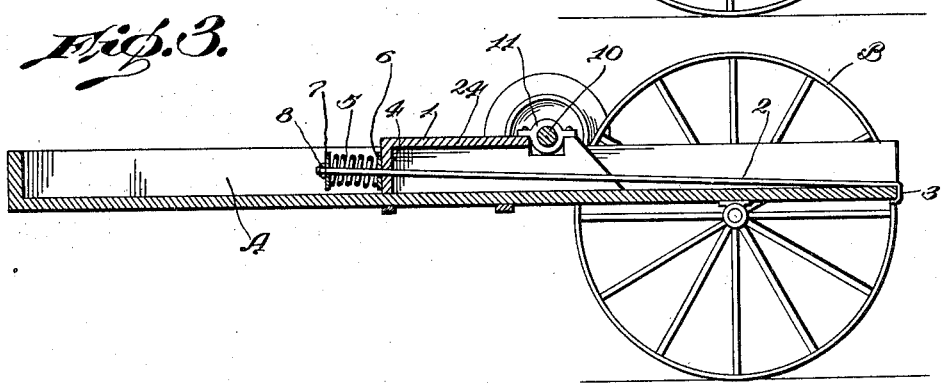
Fig. 3 is a longitudinal section through the wire reel taken on the line 3—3 of Fig. 1.

Referring more particularly to the drawings, the improved wire reel comprises a supporting box structure 1 which is adapted to be mounted in the bed A of an ordinary farm wagon or analogous structure and it is connected to the end of the bed A by means of rods 2. The rods 2 have hook ends 3 which engage over the ends of the bed A and these rods also extend through the side 4 of the box 1 and have spring 5 coiled there about. The springs 5 engage against washers 6 which abut the box 1 and against washers 7 at their opposite ends, which washers are held in adjusted positions on the ends of the rods 2 by means of nuts 8. Adjustment of the nuts 8 will permit tensioning of the springs 5. The springs 5 are provided for yieldably maintaining the friction wheels 9 in engagement with the tires or perimeters of the wheels B of the wagon structure so that the friction wheels 9 and consequently the shaft 10 upon which they are mounted will be rotated by rotation of the wheels B. The shaft 10 is rotatably carried by suitable bearing boxes 11 which are in turn carried by the supporting box 1. A reel 12 is pinned upon the shaft 10 for rotation therewith, and the wire as shown at 13, wound upon the reel 12 is connected to the reel so that it will be wound thereon by the rotation of the shaft 10. A wire guiding roller 14 is provided which is carried by a shaft 15. The shaft 15 is movable longitudinally through its bearings 16 which are in turn carried by an auxiliary supporting plate or member 17.

A suitable pin 18 is provided for limiting the longitudinal movement of the shaft 15. The carrying box 1 is anchored to the body or bed of the wagon A by suitable anchoring members or rods 20, the lower ends of which are angled as shown at 21 for engagement beneath the wheel guards 22 formed on the bed A, while their upper ends are angled as shown at 23 for engagement with the upper surfaces of the top 24 of the carrying box 1.

It is, of course, to be understood that the invention may be constructed in other manners and the parts associated in different relations and, therefore, I do not desire to be limited in any manner except as set forth in the claims hereunto appended.

Having thus described my invention what I claim is:

1. In a wire reel, the combination with a wagon including a bed and wheels, of a carrying box, rods extending through said carrying box and engaging the wagon bed, springs coiled about portions of said rods for establishing yieldable connection between the carrying body and wagon bed, means for tensioning said springs, a wire receiving reel carried by said carrying body, and means for rotating said reel by rotation of the wagon wheels.

2. In a wire reel, the combination with a wagon including a bed and wheels, of a carrying box, rods extending through said carrying box and engaging the wagon bed, springs coiled about portions of said rods for establishing yieldable connection between the carrying body and wagon bed, means for tensioning said springs, a shaft carried by said carrying body, friction wheels upon said shaft adapted to engage said wagon wheels for rotating the shaft by rotation of the wagon wheels, a wire receiving reel on said shaft for rotation therewith.

In testimony whereof I affix my signature.

HENRY J. HANSON.